United States Patent [19]
Ruth

[11] Patent Number: 5,975,278
[45] Date of Patent: Nov. 2, 1999

[54] CAM ACTUATED BOTTLE UNSCRAMBLER SYSTEM

[75] Inventor: Michael A. Ruth, Palm Harbor, Fla.

[73] Assignee: Omega Design Corporation, Exton, Pa.

[21] Appl. No.: 08/954,295

[22] Filed: Oct. 17, 1997

Related U.S. Application Data

[60] Provisional application No. 60/028,654, Oct. 17, 1996.

[51] Int. Cl.$^6$ .................................................. B65G 47/252
[52] U.S. Cl. ............... 198/377.01; 198/376; 198/377.07; 198/395
[58] Field of Search ................ 198/376, 377.01–377.07, 198/395, 397.01–397.05, 398, 399

[56] References Cited

U.S. PATENT DOCUMENTS

| | | | |
|---|---|---|---|
| 4,655,338 | 4/1987 | Hershey et al. | 198/395 |
| 5,261,520 | 11/1993 | Duke | 198/377.1 |
| 5,421,447 | 6/1995 | Ruth et al. | 198/377.1 |

*Primary Examiner*—Joseph E. Valenza
*Assistant Examiner*—Mark Deuble
*Attorney, Agent, or Firm*—Eugene E. Renz, Jr.

[57] ABSTRACT

A mechanism for selectively rotating pocket assemblies between first and second limit positions. The mechanism comprises a cam follower block mounted on the shaft of the pocket assembly for limited movement relative to the shaft in a predetermined plane and direction. Biasing means normally urges said cam block toward the first limit position. Upper and lower cam followers have centers of rotation to one side of and parallel to said predetermined plane. A profile cam is mounted on the shaft and rotatable relative to the cam block having two diametrically opposed shoulders and arcuate profile surfaces connecting the shoulders. The spring biasing means normally biases the cam block and the profile cam to a position where one of the cam followers engages a shoulder to prevent rotation of the cam block and therefore the pocket assembly and wherein the other cam follower is spaced from the profile cam. The other cam follower is engagable with a profile cam track comparable to displace the cam follower block upwardly to disengage the first cam follower and effect rotation of the profiled cam and pocket assembly.

2 Claims, 7 Drawing Sheets

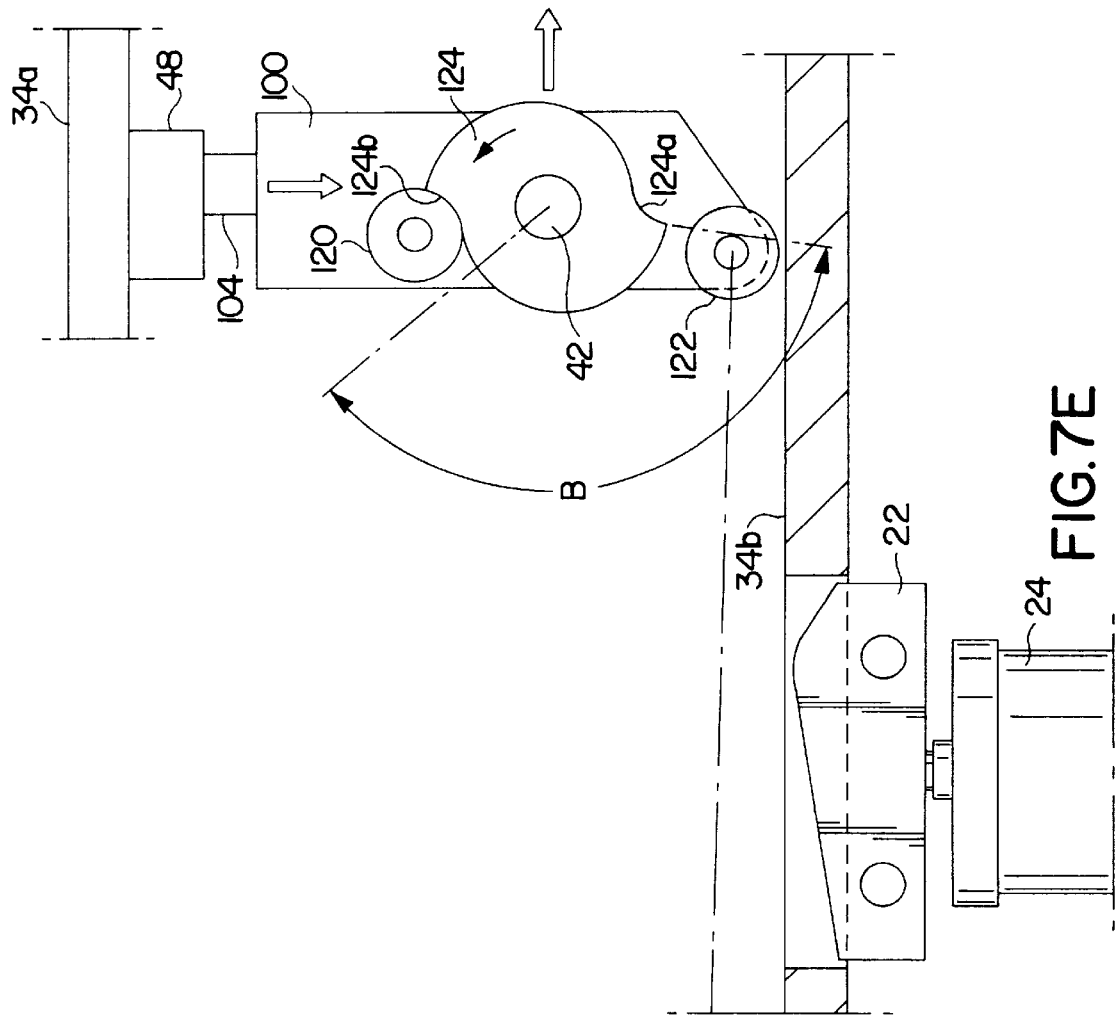
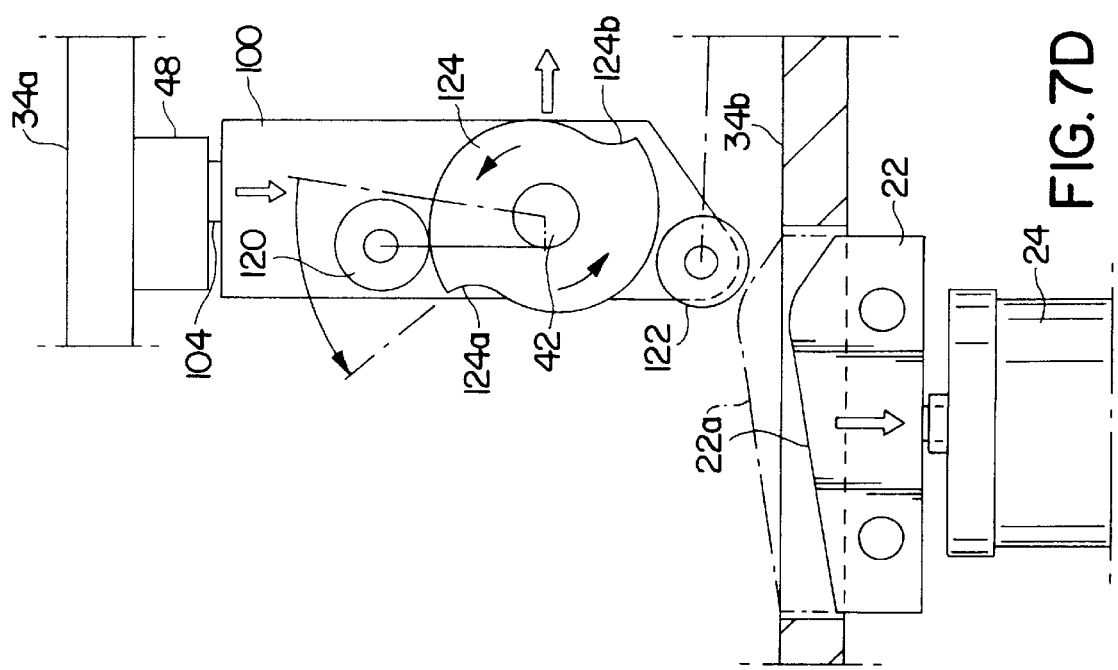

CAM ACTUATED BOTTLE UNSCRAMBLER SYSTEM

FIELD OF THE INVENTION

This application claims the benefit of U.S. Provisional Application No. 60/028,654 filed Oct. 17, 1996.

The present invention relates to improvements in so-called "bottle unscramblers" of the type shown in U.S. Pat. No. 4,655,338, issued Apr. 7, 1987 entitled BOTTLE UNSCRAMBLER ('338). The '338 patent is owned by the common assignee of the present invention.

SUMMARY OF THE INVENTION

In the bottle unscrambler system shown and described in the '338 patent, bottles are delivered to an in-feed station in either a top up or top down attitude and moved along a predetermined paths by means of a plurality of rotating pocket assemblies as best illustrated in FIG. 5. These rotating pocket assemblies, as shown in FIG. 7, basically comprise a pair of gripper jaws which are actuatable between open and closed positions to engage bottles at the in-feed station and deliver them along the path through various operations. The rotating pocket assemblies include a drive sprocket 142 which cooperatively engages with racks 180 and 182 to selectively rotate the pocket assembly whenever the bottles may be positioned in either an up or down attitude during the course of traversing the path.

As shown in FIG. 5, the bottles are moved by the pocket assemblies to a first "bottle sensing and bottle orientation station" which senses the attitude of the bottles. If the bottles are in an open end up position, the pocket assemblies are activated to rotate the bottles so that they face downwardly to facilitate cleaning at the "high pressure ionized air cleaning station". If the bottles delivered from the in-feed station are already in a top down attitude, the sensor 74 does not trigger activation of the pocket assembly to rotate the bottle. Down stream, the bottles are rotated to an up position for discharge to a conveyor for further processing. It is noted that in FIG. 5 all of the bottles are rotated to an up position by a fixed cam mechanism 84. Drive sprocket 142 of the rotating pocket assemblies includes a one way clutch to permit free wheeling of the drive sprockets 142 in instances where the bottle is not inverted.

Even though these systems are generally effective and the rotating pocket assemblies work satisfactorily to produce the functions in the manner described above, it has been found that there are certain disadvantages and drawbacks. For example, clutch wear over a period of time, necessitates replacement. Further, the hard continuous engagement of the drive sprocket and racks produces wear and necessitates periodic replacement of the drive sprocket and racks. In this regard, it is noted that irrespective of whether the bottles need to be rotated to position them for the various operations in the manner described above, the drive sprocket is in continuous contact with the rack. Of course, replacement of the components described above results in down time which is undesirable.

The present invention is characterized by novel features of construction and arrangement providing an improved bottle unscrambler system which obviates some of the disadvantages and drawbacks of the bottle unscrambler system described above in connection with the '338 patent. The rotating pocket assembly of the present invention does not operate on the basis of inter-engaging sprocket and racks and therefore, eliminates the problems associated with these continuously operating elements. Essentially, the present inventions provides a novel cam arrangement for activating the rotating pockets wherein the initial portion of the cycle produces rapid rotation of the pocket assembly and the latter part of the cam cycle produces a gradual, slower rotation of pocket assemblies through a total cycle of 180°.

BRIEF DESCRIPTION OF THE DRAWINGS

These and other objects of the present invention and various features and details of the operation and construction thereof are hereinafter more fully set forth with reference to the accompanying drawings, wherein;

FIGS. 7a–7e, inclusive, are schematic sequential views illustrating the variable speed 180° rotation of a cam actuated pocket assembly at the first rotate or non-rotate bottle orientation station by means of an air actuated cam track;

DETAILED DESCRIPTION OF THE PREFERRED EMBODIMENT

Figure 1:
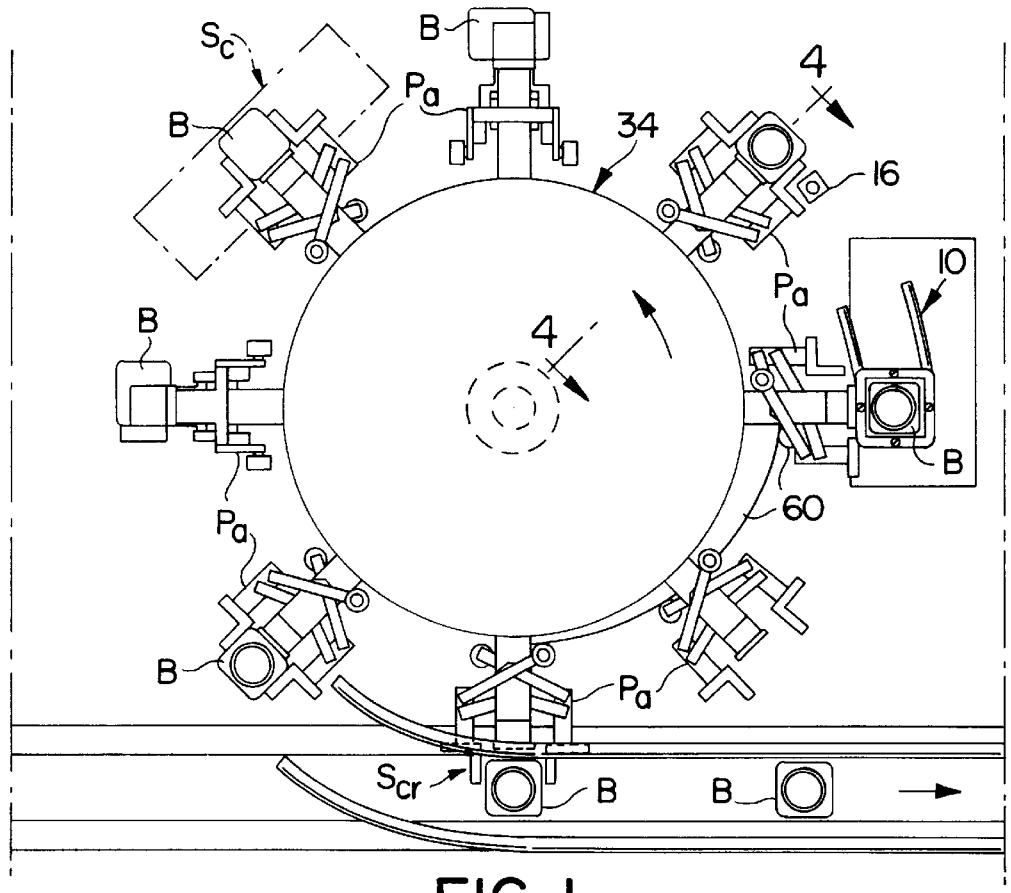
FIG. 1 is a schematic fragmentary plan view showing the rotatable turret and associated pocket assemblies of a bottle unscrambling, cleaning and orienting device.
Figure 3:
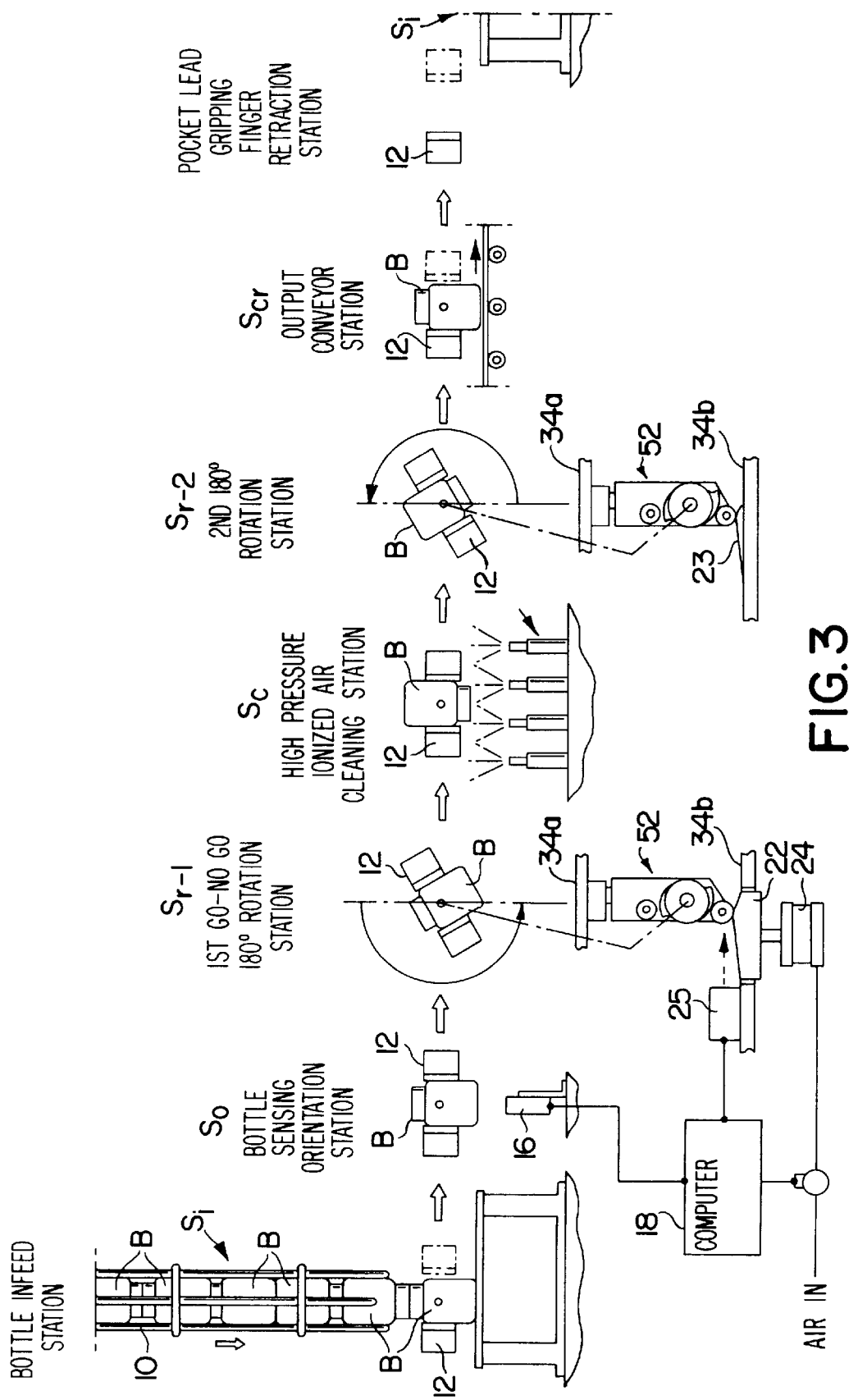
FIG. 3 is a schematic sequential flow diagram showing the scrambled orientation of the bottles at the in-feed station, the orientation sensing of the bottle removed by the pocket assembly from the in-feed station, the first go-no 180° rotation station, the bottle cleaning station, the second 180° rotation station, the output conveyor station, and the lead pocket finger retraction station at the bottle in-feed station.

Referring now to the drawings and particularly to FIGS. 1 and 3 thereof, the overall system of the present invention is shown schematically. Lidless, empty bottles B are delivered in random fashion to a wire in-feed chute 10 at a bottle in-feed station $S_i$. The gripping jaws 12 of a pocket assembly $P_a$ embrace the lowermost bottle at the in-feed station $S_i$ and transports the bottle B through various stations including a bottle sensing and orientation station $S_o$, which senses the orientation of the bottle B by an orientation detector 16. If the bottle is oriented top up, a signal is sent to computer 18 which in turn activates a solenoid operated valve 20 to raise a cam track 22 via air cylinder 24 to cycle the pocket assembly for 180° rotation of the bottle at the first rotation station $S_{r-1}$. The bottles B then are carried through a cleaning station $S_c$ and a second rotation station $S_{r-2}$ where all of the bottles B are rotated 180° to a top-side up orientation for deposit on an output conveyor $S_{cr}$.

Referring now to FIG. 1, the various stations of the bottle unscrambler are shown in plan view. As shown therein, a plurality of pocket assemblies $P_a$ are mounted at circumferentially spaced locations around a turret 34 which is driven in the present instance in a counter-clockwise direction by suitable drive means, such as an electric motor located under the turret. The details of the mounting arrangement are shown and described more specifically in the '338 patent referenced above.

Figure 4:
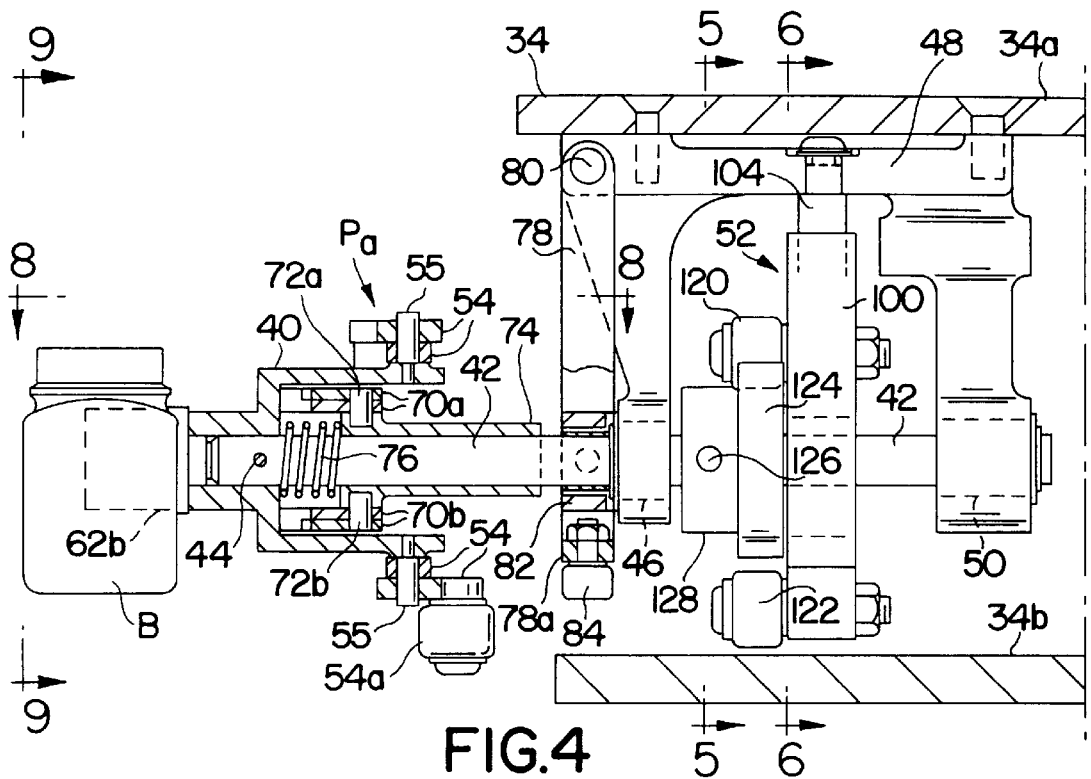
FIG. 4 is an enlarged fragmentary side elevational view of one of eight pocket assemblies having portions broken away and in section to clearly show certain details of assembly— all shown in accordance with the invention.
Figure 8:
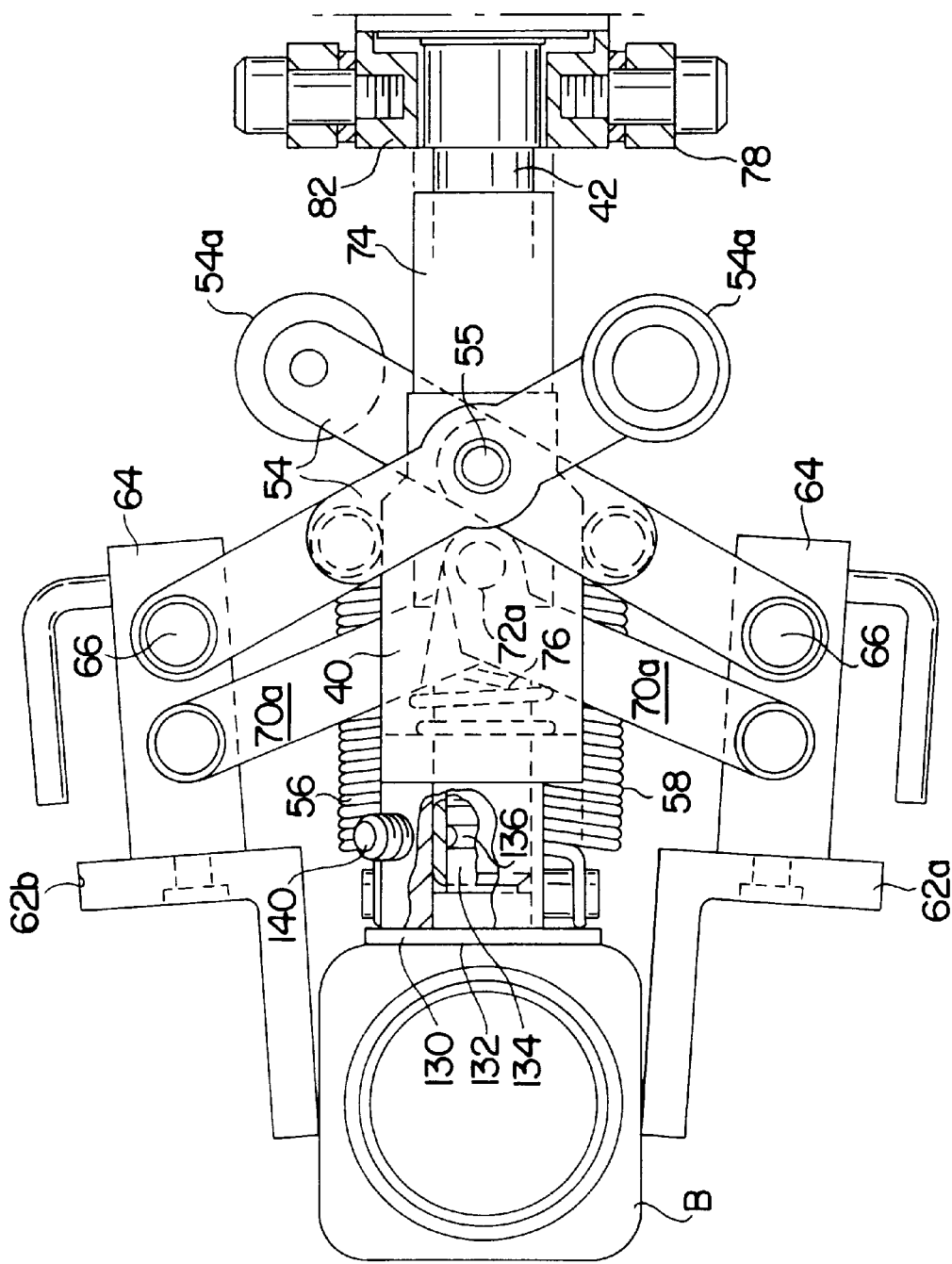
FIG. 8 is a greatly enlarged fragmentary plan view taken on the line 8,8 of FIG. 4 showing details of the bottle gripping assembly having a quick release bottle engaging shoe.

FIG. 4 shows the structural details of the pocket assembly $P_a$. Each pocket assembly Pa as shown in FIGS. 4 and 8 comprises a "U" shaped yoke 40 connected to the shaft 42 by pin 44. The shaft 42 is rotatably journaled in the forward arm of a casting 48 fastened to the underside of the upper deck $34_a$ of the turret 34. The inner terminal end of shaft 42 is journaled in a clutch and bearing assembly 50 housed in a rearward arm of casting 48. The mechanism for rotating the pocket assemblies is broadly designated 52 and is mounted on the shaft between the front bearing 46 and clutch and bearing 50 as illustrated in FIG. 4.

Figure 9:
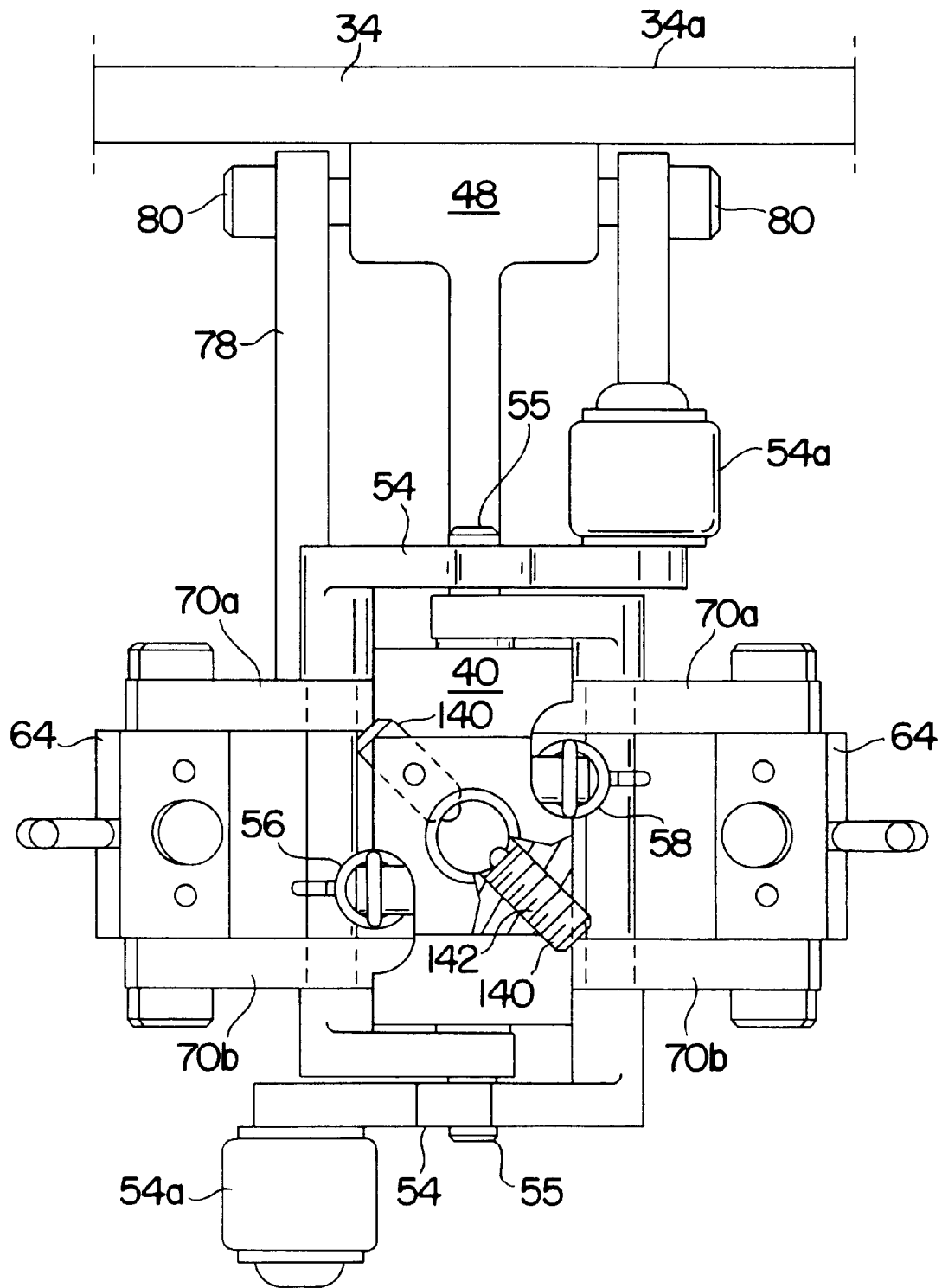
FIG. 9 is an enlarged fragmentary elevational view taken on the line 9,9 of FIG. 4 showing details of the pocket bottle gripping assembly with the bottle and bottle engaging shoes removed to clearly show certain details of assembly.

The pocket assembly $P_a$ further includes a pair of cam actuated retraction link assemblies 54 pivotly mounted to a fixed pivot post 55 on the yoke 40 as best shown in FIGS. 8 and 9 of the drawings. Each retraction link assembly mounts a cam follower $54_a$. Each of the retraction link assemblies 54 is spring biased to an inward limit position by means of two tension springs 56 and 58 when a lower cam follower $54_a$ of the retraction link assembly 54 interengages a retraction cam surface 60 mounted on the fixed lower deck $34_b$ of the turret assembly. The leading moving gripping finger $62_a$ is retracted to allow the trailing gripper finger 62b to sweep a bottle B from the bottle infeed station 10. When the terminal end of the retraction cam surface 60 is passed, the lead gripping finger 62a is spring biased forwardly by spring 58 closing on the leading side of the moving bottle B to embrace the bottle B positively.

The outer terminal ends of the retracting links 54 are pivotally connected to a pair of pivot arms 64. This pivotal connection creates a pivot point 66 about which the gripping fingers $62_a$ and $62_b$ are opened or closed upon a bottle sides such as bottle B. To this end then the two pairs of gripping links $70_a$ and 70b are pivotally connected on their outer terminal ends to the pivot arms 64 and pivotally connected on their inner ends to upper and lower pivot posts $72_a$ and $72_b$. The pivot posts $72_a$ and $72_b$ are fixedly supported on a gripper shoulder pin block 74. The gripper shoulder pin block 74 is slidably mounted on the shaft 42 (see FIG. 4) and normally spring biased inwardly toward the turret 34 by means of compression spring 76 moving the gripper fingers toward each other. The opening of the gripper fingers $62_a$ and $62_b$ is effected by a pivotally supported bifurcated swing arm 78 pivotally connected to the casting 48 at pivot 80 (see FIG. 4) pivotally connected to the bifurcated swing arm 78 is a pusher block 82 which bearingly and spacedly surrounds shaft 42. The lower terminal end $78_a$ of the swing arm 78 mounts a cam follower 84 that interengages with a gripping finger cam track 86 mounted on the lower fixed deck $34_b$ of the turret assembly (see FIG. 2). When the cam follower 84 engages the cam track 86, the swing arm 78 is pivoted outwardly bringing the pusher block 82 into pressing engagement with the inner terminal end of the spring biased gripper shoulder pin block 74. As the pivot post $72_a$ of the pin block 74 moves outwardly, the gripping links $70_a$ and $70_b$ open forcing the pivot arms 64 and associated gripping fingers $62_a$ and $62_b$ to open against the bias of compression spring 76. When the cam follower 84 exits the cam track 86 the gripper shoulder pin block 74 moves inwardly due to the bias of the compression spring 76 bringing the gripping fingers $62_a$ and $62_b$ into engagement with the bottle sides. This portion of the pocket assembly $P_a$ is basically the same as described in the '338 patent referred to above and is described in some detail to explain how this portion of the pocket assembly can function to pick up bottles at the infeed station, retain them and release them as desired.

Figures 5, 6:
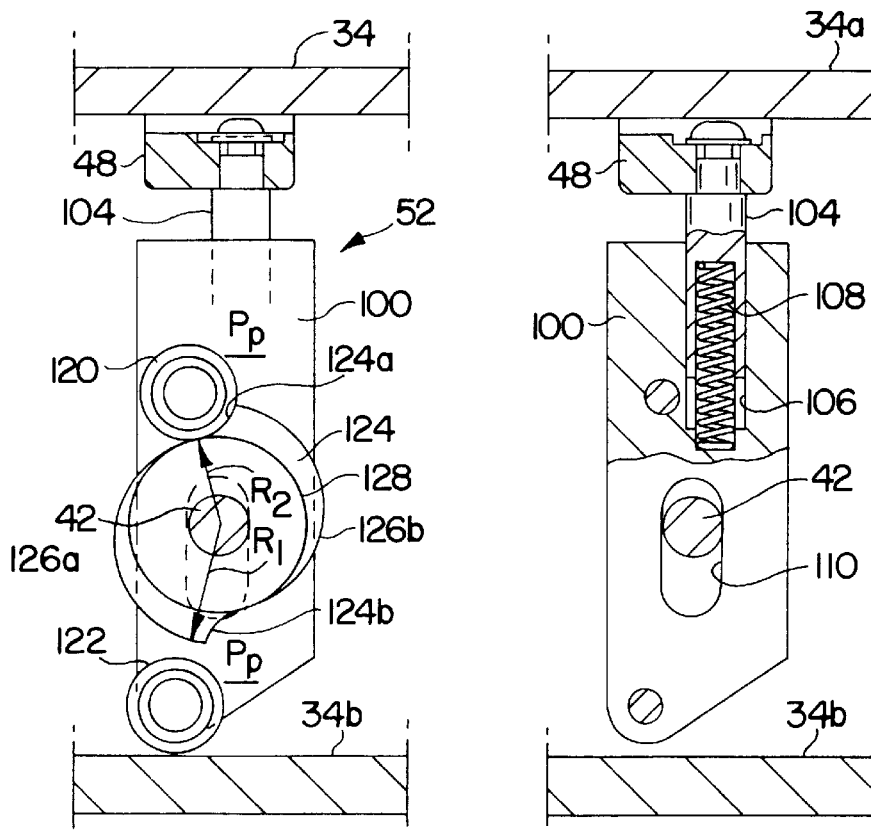
FIG. 5 is an enlarged fragmentary sectional elevational view taken on the line 5, 5 of FIG. 4 showing details of the cam actuated pocket rotation assembly.
FIG. 6 is an enlarged fragmentary sectional elevational view taken on the line 6,6 of FIG. 4 showing details of the spring biased cam follower mounting block.

In accordance with the present invention, novel actuator means is provided for selectively rotating the pocket assemblies between limit positions at predetermined times in the cycle. This mechanism has been broadly designated by the numeral 52 and as illustrated in FIGS. 5 and 6 comprises a cam follower block 100 mounted below the upper deck $34_a$ on casting 48 and depending spring post 104 which engages in an elongated bore 106 in the cam follower block 100. As illustrated in FIG. 6, an elongated coil spring 108 normally biases the cam follower block 100 in a downward direction toward the fixed lower deck $34_b$. The cam follower block 100 has an elongated opening 110 which straddles the shaft 42 and allows limited up and down movement relative to the shaft. The cam block 100 has limited movement in an axial direction in a plane $P_p$ passing through the center of the shaft 42. There are two rotatably mounted cam followers, an upper cam follower 120 and a lower cam follower 122 which have centers of rotation on plane to one side of and parallel to the plane $P_p$. A rotating profiled pocket cam 124 is mounted on the shaft 42 by means of set screw 126 and collar 128. The profile cam 124 illustrated has symmetrical profile surfaces $124_a$ and $124_b$ defining shoulders or stop surfaces at diametrical opposed locations. Normally the cam follower block 100 is biased downwardly, whereby the upper cam follower 120 engages the shoulder $124_a$ and normally prevents counter clockwise rotation of the shaft 42, while clockwise rotation of the shaft 42 is prevented by clutch and bearing means 50, positioning the bottles in either a bottle up or a bottle down limit position. Lower cam follower 122 is normally spaced slightly from the upper surface of fixed lower deck $34_b$.

Figure 7C:
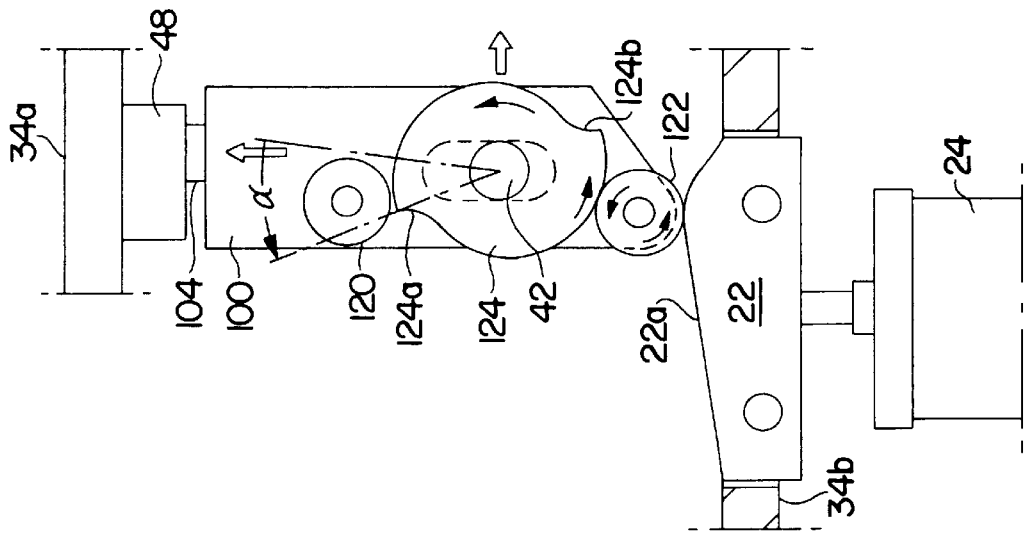
Figure 7B:
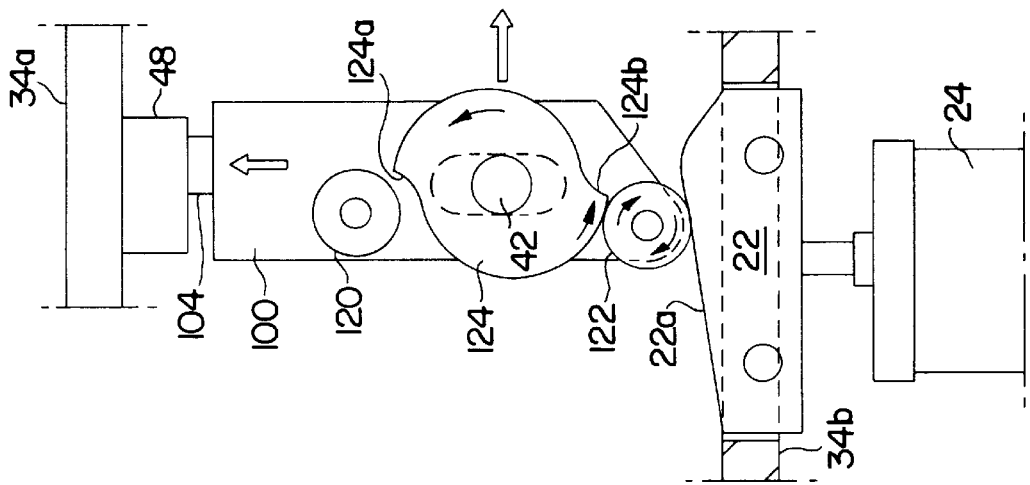
Figure 7A:
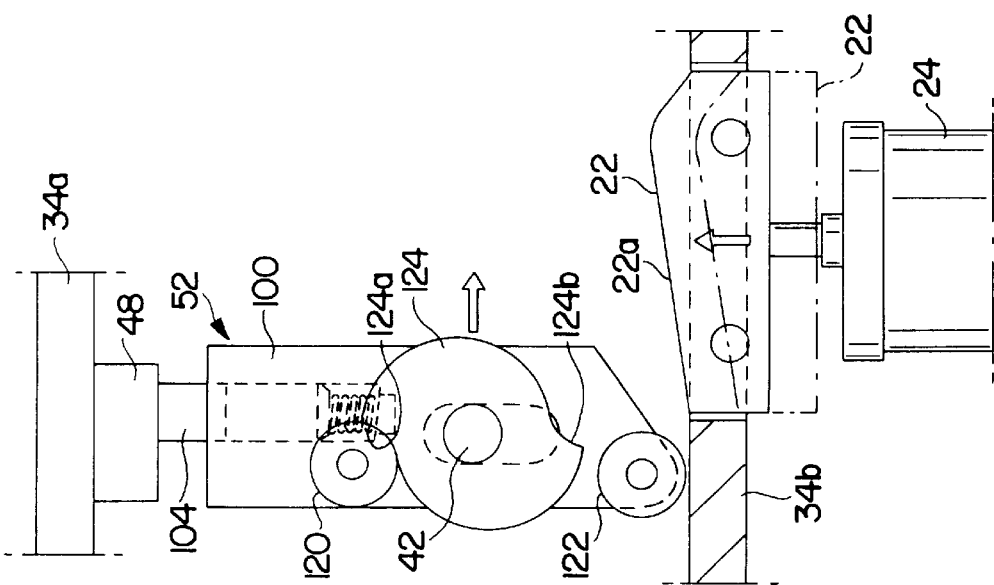

With reference to FIGS. 7a–7e, a cam track 22 actuatable between upper and lower limit positions depending on signals from the sensor 16 effects cycling of the pocket assembly $P_a$ through the cam follower block 100 in the following manner. Assume that the sensor detects a bottle in a top-up position at the sensor 16 and orienting station $S_o$. A signal is sent to the computer 18 to activate air cylindrical 24 to raise the cam track 22 to its upper limit position as shown in FIG. 7a. Accordingly, when the bottle assembly $P_a$ is in a position to engage the cam track 22, the lower cam follower 122 rides up the cam profile $22_a$ to frictionally engage the rotating profiled pocket cam 124.

As shown in FIG. 7b as the lower cam follower 122 rides up the cam track $22_a$ into frictional engagement with the rotating profiled pocket cam 124. The upper cam follower 120 is also elevated out of engagement with the shoulder $124_a$ of the profiled pocket cam 124 allowing enough clearance for the profiled pocket cam 124 to be frictionally driven past and beneath the cam follower 120 in a counter clockwise direction while rotation in a clockwise direction is prevented by the clutch and bearing assembly 50. As cam follower 122 passes the apex of air actuated cam track 22, the cam track 22 is retracted by a signal from sensor 25 and the upper cam follower 120 is driven into contact with the profiled pocket cam 124 by means of the compression spring 108 while the bottom cam follower 122 moves away from the profiled pocket cam 124. The spring biased pressure of the cam follower 120 on the profiled pocket cam 124 causes the pocket cam 124 to continue its counter clockwise rotation at a slower rate than the frictionally driven portion of the cycle shown as in the drawings. The counter clockwise rotation of the profiled pocket cam continues through angle B until the shoulder 124$_b$ engages the upper cam follower 120 having rotated the shaft 42 and associated bottle gripping assembly through 180° orienting the bottle B in a desired top down position. The spring 10$_b$ still retains stored energy holding the shoulder 124$_b$ rightly against the cam follower 120. The smooth controlled rotation of the pocket assembly produces less wear on the interengaging parts and ensures a longer life of the components of the pocket assembly. With respect to FIG. 5, the outer arcuate surfaces 126$_a$ and 126$_b$ of the profile cam 124 are surfaces generated by a series of equally spaced angular divisions of 180°. Each angular division has a constantly diminishing radius as measured from the center of rotation of the shaft 42, from a largest radius R$_1$ adjacent the shoulders 124$_a$ and 124$_b$ to the smallest radius R$_2$ where the shoulders 124$_a$ and 124$_b$ blend into conformity with the outer circumference of the cam follower 120.

Figure 2:
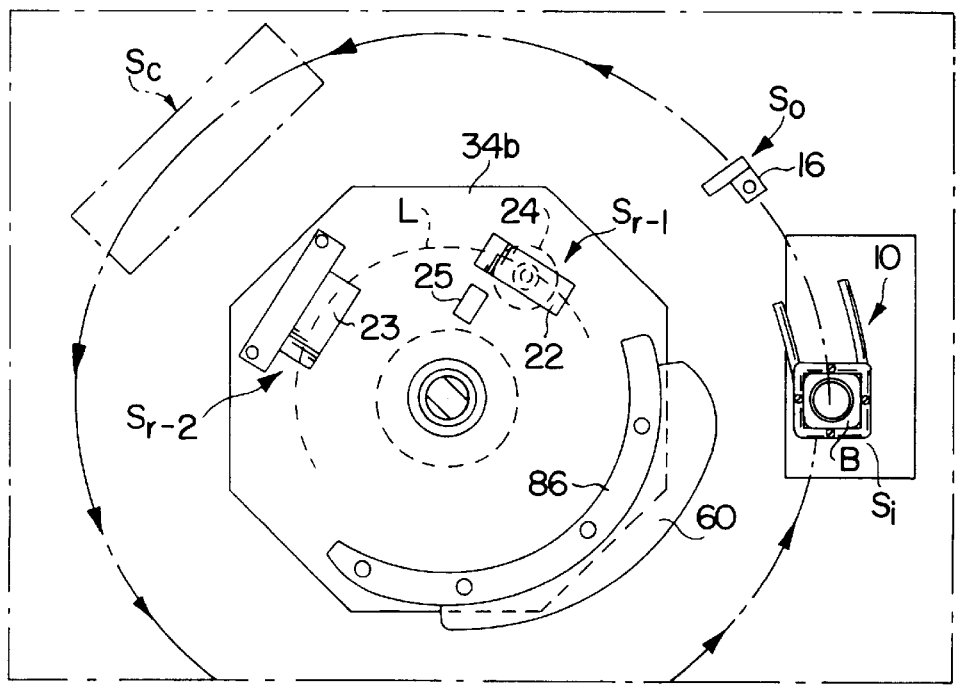
FIG. 2 is a fragmentary schematic plan view of the fixed non-rotating deck that underlies the rotating turret and associated pocket assemblies and mounts the air activated cam track, the fixed cam track, bottle release cam track and the gripping finger retraction cam track. There is also shown the locus of the bottle path in dot and dash line and in full line a fragmentary plan view of the bottle in-feed station.

Since all the bottles B must be oriented in a top down position for processing they must be reoriented in a top up position for deposit on a conveyor system. With reference to FIG. 2, a second cam track 23 having the same cam track profile as cam 22 is fixedly positioned on the lower fixed deck 34$_b$ of the turret assembly on the locus traced by the rotation mechanism 52 of the pocket assemblies P$_a$. As each pocket assembly P$_a$ passes over the fixed cam track 23, the pocket assemblies P$_a$ are rotated counter clockwise through 180°, in exactly the same sequence of motions described above bringing all the bottles B retained in the pocket assemblies P$_a$ to a top up orientation for deposit on a conveyor. In accordance with another feature of the present invention, the rotating pocket assembly P$_a$ includes a shim or indexing plate whereby containers of different sizes and shapes may be accommodated and which has the function of properly positioning various sized bottles so that they are precisely aligned with the sensors in the overall system. To this end as best illustrated in FIGS. 8 and 9, there is provided in this instance a generally rectangular plate 130, having a flat planar outer face 132 confronting the flat surface of the bottles B. As illustrated in FIG. 8, a stub shaft 134 projects from the inner face of the plate 130. The stub shaft 134 has a circumferentially extending groove 136 forming part of the detachable locking means for supporting the plate 130 at one end of the rotating pocket assembly P$_a$. Spring biased ball screws 140 are mounted in threaded bores 142 at diagonally opposed locations, the ball screws are mounted in the forward nose portion of the yoke 40 of the rotating pocket assembly and are aligned so that the balls engage in the groove 136 to hold the plate in place. When it is desired to replace the plate 130 it is simply pulled outwardly in an axial direction, the spring biased balls release themselves from the groove 136. In the case of containers or bottles having an arcuate or cylindrical shape, a plate having an arcuate front face is used in lieu of the flat faced plate described above.

Even though particular embodiments of the present invention have been illustrated and described herein, it is not intended to limit the invention and changes and modifications may be made therein within the scope of the following claims.

What is claimed is:

1. A mechanism for selectively rotating pocket assemblies between first and second limit positions, comprising:

a cam follower block mounted on the shaft of the pocket assembly for limited movement relative to the shaft in a predetermined plane and direction;

biasing means normally urging said cam block toward said first limit position;

upper and lower cam followers having centers of rotation to one side of and parallel to said predetermined plane;

a profile cam mounted on the shaft and rotatable relative to the cam block having two diametrically opposed shoulders and arcuate profile surfaces connecting the shoulders;

said spring biasing means normally biasing the cam block and the profile cam to a position where one of said cam followers engages a shoulder to prevent rotation of the cam block and therefore the pocket assembly and wherein the other cam follower is spaced from the profile cam; and the other cam follower engagable with a profile cam track operable to displace the cam follower block upwardly to disengage the first cam follower and effect rotation of the profiled cam and rotating pocket assembly.

2. A mechanism as claimed in claim 1 wherein the cam plate has an elongated slot through which the shaft engages of a configuration to allow only up and down movement of the cam plate in said predetermined plane.

* * * * *